United States Patent
Theios

(10) Patent No.: US 7,845,142 B2
(45) Date of Patent: Dec. 7, 2010

(54) HIGH R-VALUE WINDOW UNIT WITH VACUUM IG UNIT AND INSULATING FRAME

(75) Inventor: Jason Theios, Toledo, OH (US)

(73) Assignee: Guardian Industries Corp., Auburn Hills, MI (US)

( * ) Notice: Subject to any disclaimer, the term of this patent is extended or adjusted under 35 U.S.C. 154(b) by 379 days.

(21) Appl. No.: 11/317,255

(22) Filed: Dec. 27, 2005

(65) Prior Publication Data

US 2007/0144085 A1    Jun. 28, 2007

(51) Int. Cl.
*E06B 3/67* (2006.01)
*E06B 3/24* (2006.01)

(52) U.S. Cl. .................. 52/786.1; 52/204.6
(58) Field of Classification Search ............ 52/786.1, 52/786.11, 204.6, 204.593, 204.597, 171.3, 52/172, 204.71, 204.705; 428/34; 156/109
See application file for complete search history.

(56) References Cited

U.S. PATENT DOCUMENTS

| | | | |
|---|---|---|---|
| 3,682,528 A | 8/1972 | Apfel et al. | |
| 4,413,877 A | 11/1983 | Suzuki et al. | |
| 4,683,154 A * | 7/1987 | Benson et al. | 428/34 |
| 5,027,574 A * | 7/1991 | Phillip | 52/171.3 |
| H000975 H * | 11/1991 | Selkowitz et al. | 52/172 |
| 5,107,649 A * | 4/1992 | Benson et al. | 52/309.4 |
| 5,156,894 A * | 10/1992 | Hood et al. | 428/34 |
| 5,425,861 A | 6/1995 | Hartig et al. | |
| 5,557,462 A | 9/1996 | Hartig et al. | |
| 5,688,585 A | 11/1997 | Lingle et al. | |
| 6,105,336 A | 8/2000 | Katoh et al. | |
| 6,336,984 B1 | 1/2002 | Aggas | |
| 6,365,242 B1 | 4/2002 | Veerasamy | |
| 6,372,312 B1 | 4/2002 | Aggas | |
| 6,399,169 B1 | 6/2002 | Wang et al. | |
| 6,497,931 B1 | 12/2002 | Aggas | |
| 6,692,600 B2 | 2/2004 | Veerasamy et al. | |
| 6,886,297 B1 | 5/2005 | Crandell | |
| 6,936,347 B2 | 8/2005 | Laird et al. | |
| 6,968,888 B2 | 11/2005 | Kolowich | |
| 6,971,443 B2 | 12/2005 | Kung et al. | |
| 2004/0188124 A1 | 9/2004 | Stark | |

OTHER PUBLICATIONS

News Release Oct. 25-26, 2004 Journalists and Scientists in Dialogue—Energy Management, "Phase Change Materials—Latent Heat Storage for Interior Climate Control", Schmidt (pp. 1-9).
Environmental Engineering, Fraunhofer Magazine Jan. 2004, "Storing Heat With Wax" (pp. 36-37).

* cited by examiner

*Primary Examiner*—Michael Safavi
(74) *Attorney, Agent, or Firm*—Nixon & Vanderhye P.C.

(57) ABSTRACT

In certain example embodiments of this invention, a window unit may include a vacuum IG (VIG) unit as an inboard lite and a monolithic lite (e.g., with an optional low-E coating thereon) as an outboard lite. A dead air space may separate the inboard and outboard lites. A highly insulated frame may be used to support the inner and outer lites. The VIG unit may be partially embedded or supported in the insulative frame, so that the insulating frame separates the VIG unit inboard lite from the outboard lite thereby reducing conductivity around the edges of the window unit so that R-value can be increased (and U-value decreased). In certain example embodiments, the total R-value of the window unit is at least about R-8, and more preferably at least about R-10 (compared to the much lower R-values of conventional IG units).

20 Claims, 1 Drawing Sheet

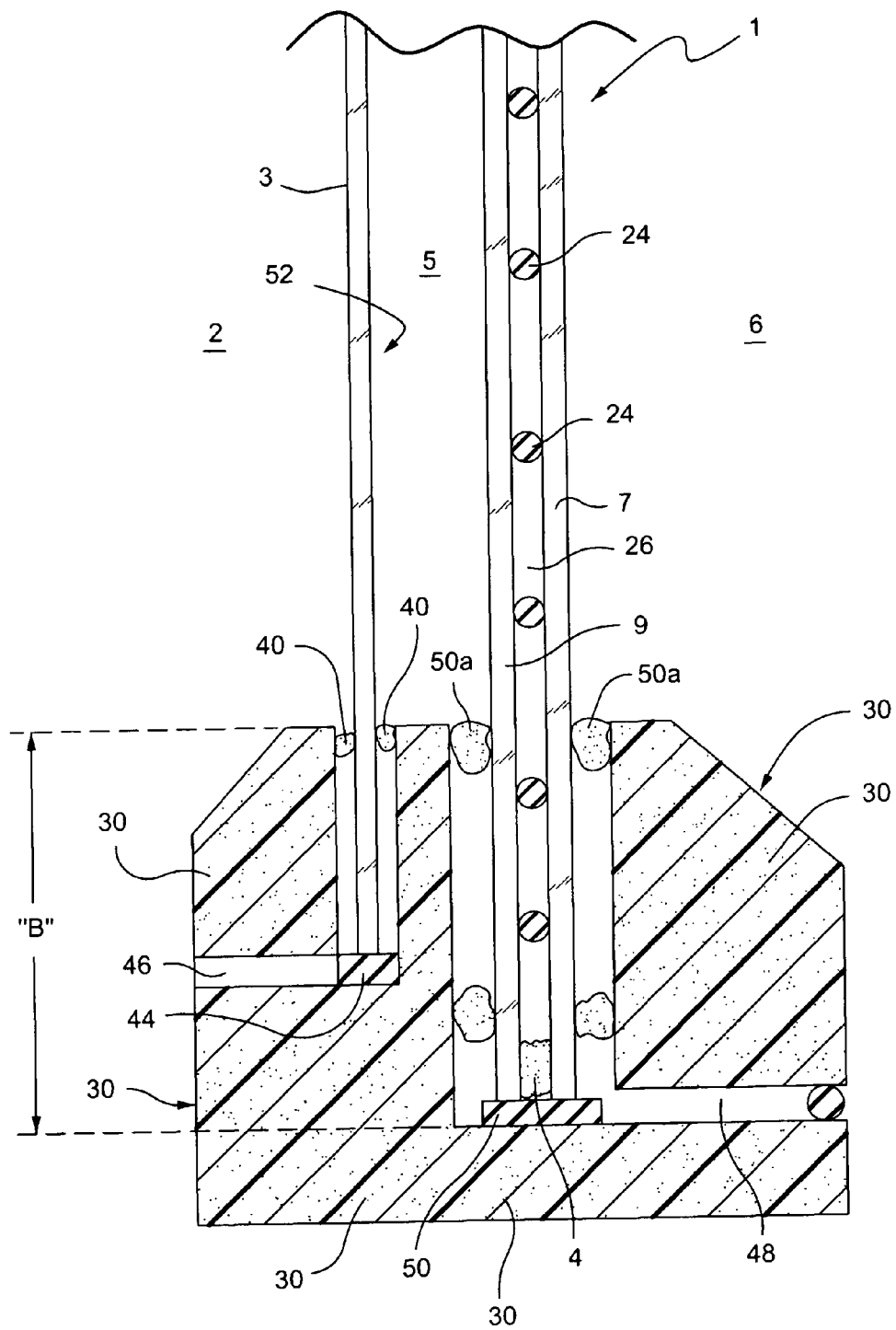

HIGH R-VALUE WINDOW UNIT WITH VACUUM IG UNIT AND INSULATING FRAME

This application relates to a window unit designed so as to have a high R-value. In certain example embodiments, the window unit includes a vacuum IG (VIG) unit as an inboard lite and a monolithic lite (e.g., with a low-E coating thereon, optionally) as an outboard lite; where a dead air space separates the two lites which are both supported by an insulating frame such as a sash. The design may result in a higher and thus improved R-value for the window unit.

BACKGROUND AND SUMMARY OF THE INVENTION

It is known in the art that R-value is a measure of the insulating characteristics of a window. In particular, R-value is the reciprocal of U-value. In other words, U value=1/R-value. The term U-value or U-factor (synonymous with thermal transmittance) is well understood in the art and is used herein according to this well known meaning. U-value herein is reported in terms of $BTU/hr/ft^2/degrees$ F., and may be determined accorded to the guarded hot box method as reported in and according to ASTM designation C1199-91 (incorporated herein by reference). Similarly, R-value is the reciprocal of U-value as explained above.

The R-value for a monolithic glass sheet (one sheet of glass) is typically around 1.0. Moreover, the R-value for an insulating glass (IG) unit with two sheets of uncoated glass spaced apart from each other is typically about 2.0 (i.e., U value of about 0.5). When one of the glass sheets of an IG unit is coated with a low-E (low emissivity) coating, the R value can be increased (e.g., to about 3 or 4). Argon gas between the glass sheets of an IG unit can also increase R-value (and thus decrease U-value).

Conventional IG units often use metal spacer(s) as the edge of the units to space the glass sheets from one another. However, this causes U values to be higher (and thus R values to be lower) at the edges of such IG units due to the conductivity of the metal spacer(s). It would be advantageous to avoid the use of metal spacers at edges of a glass-based window unit, thereby reducing conductivity of the spacing structure. Plastic spacers have been used previously to address this problem, but have resulted in gas (e.g., Ar) leakage through the plastic thereby leading to durability and insulating problems.

In certain example embodiments of this invention, a window unit may be provided which does not necessarily need a metal spacer in an IG unit. In certain example embodiments, a window sash has a spacer function/structure which may be of plastic or the like; e.g., vinyl or some other polymer based material. Thus, in certain example embodiments, part of the sash may separate two glass sheets of the window from one another.

In certain example embodiments of this invention, a window unit may include a vacuum IG (VIG) unit as an inboard lite and a monolithic lite (e.g., with a low-E coating thereon) as an outboard lite. A dead air space may separate the inboard and outboard lites. Moreover, in certain example embodiments, a highly insulated frame may be used to support the inner and outer lites. The VIG unit may be partially embedded or supported (e.g., by from about 1-6 inches, more preferably from about 1 to 3 inches, with an example being about 2 inches) in the insulating frame, so that the insulating frame separates the VIG unit inboard lite from the outboard lite thereby reducing conductivity around the edges of the window unit so that R-value can be increased (and U-value increased). In certain example embodiments, the edges of the inboard and outboard lites may be vertically offset from one another, to further reduce conductivity at edges portions. In certain example embodiments, the total R-value of the window unit is at least about R-8, and more preferably at least about R-10 (compared to the much lower R-values of conventional IG units).

In certain example embodiments, there is provided a window unit comprising: an insulating frame in which a vacuum IG unit and a monolithic lite are provided, the vacuum IG unit including first and second spaced apart glass sheets that are separated from one another via a gap that is a pressure less than atmospheric, and the monolithic lite being spaced apart from the vacuum IG unit; wherein the frame comprises insulating material that separates the vacuum IG unit from the monolithic lite.

In other example embodiments of this invention, there is provided a window unit comprising: an insulating frame in which both an inboard glass lite and an outboard glass lite are partially embedded, the inboard lite comprising a vacuum IG unit including first and second spaced apart glass sheets that are separated from one another via a gap that is a pressure less than atmospheric, and the outboard lite comprising a monolithic glass sheet spaced apart from the vacuum IG unit; wherein the frame comprises insulating material that separates the outer surface of the vacuum IG unit from the inner surface of the monolithic glass sheet; and wherein along at least one of a top edge, a bottom edge, and/or a side edge of the window unit, the outer edge of the monolithic glass sheet is vertically offset from the outer edge of the vacuum IG unit so that the outer edge of the vacuum IG unit is closer to a periphery of the window unit than is the outer edge of the monolithic glass sheet.

BRIEF DESCRIPTION OF THE DRAWINGS

FIG. 1 is a cross sectional view of a window unit according to an example embodiment of this invention.

DETAILED DESCRIPTION OF EXAMPLE EMBODIMENTS OF THE INVENTION

FIG. 1 is a cross sectional view of a window unit according to an example embodiment of this invention. FIG. 1 illustrates that the window unit includes a vacuum IG (VIG) unit 1 as an inboard lite and a monolithic lite 3 as an outboard lite. A dead air space 5 separates the inboard and outboard lites. Space 5 may be at atmospheric pressure in certain example embodiments, although it may instead be filled with gas and/or at a pressure lower than atmospheric in different example embodiments. In certain example embodiments, a low-E coating 52 for reflecting IR radiation may be provided on the surface of monolithic lite 3 facing the air gap 5, although such a low-E coating 52 is optional in certain example embodiments of this invention. Example low-E coatings are described in U.S. Pat. Nos. 6,936,347, 5,688,585, 5,557,462, 5,425,861, 4,413,877 and 3,682,528, the disclosures of which are all hereby incorporated herein by reference.

The vacuum IG unit 1, which is the inboard lite in FIG. 1, includes an inner glass substrate 7 and an outer glass substrate 9. Edges of opposing vacuum IG substrates 7 and 9 are hermetically sealed by at least one edge or peripheral seal 4. "Peripheral" and "edge" seals herein do not mean that the seal(s) are located at the absolute periphery or edge of the unit, but instead mean that the seal is at least partially located at or near (e.g., within about two inches of) an edge of at least one substrate of the VIG unit. In certain example embodiments, a vacuum IG unit includes first and second opposing glass substrates 7 and 9 (tempered or non-tempered) which are spaced from one another by spacers or pillars 24 which maintain low pressure space 26 between the substrates. In certain example embodiments, substrates 7 and 9 are soda-lime-silica float glass. Hermetic peripheral or edge seal 4, provided between the substrates 7 and 9, seals off low pressure space 26 from surrounding atmospheric pressure. The peripheral/edge seal 4 may be located entirely between the opposing substrates, as shown in FIG. 1. However, the peripheral/edge seal 4 may instead be located partially between substrates 7 and 9, and partially in an L-shaped step area (not shown) at the periphery of the unit in non-illustrated instances where the glass sheets 7 and 9 are of different sizes. The evacuation of space 26 eliminates or reduces heat transport between glass substrates 7 and 9 due to gaseous conduction and convection. In addition, radiative heat transport between substrates 7 and 9 can be reduced to a low level by providing an optional low-E coating(s) on a surface of one or both of sheets 7, 9. High levels of thermal insulation can thus be achieved. Low gaseous thermal conduction may be achieved when the pressure in space 26 is reduced to a level e.g., equal to or below about $0.5 \times 10^{-3}$ Torr, more preferably below about 0.1 mTorr, or $10^{-4}$ Torr, and most preferably below about $10^{-6}$ Torr of atmospheric pressure. The hermetic sealing system 4, including one or more edge seals, substantially eliminates any ingress or outgress of gas or air to/from low pressure space 26. An array of spacers or pillars 24 is provided between substrates 7 and 9 in order to maintain separation of the two approximately parallel glass sheets 7, 9 against atmospheric pressure. In certain embodiments, all spacers 24 are of approximately the same size and/or material. However, in other embodiments, there may be different sizes of spacers 24 in the same vacuum IG unit. In certain embodiments, the density of spacers (i.e., the number of spacers per unit area) may be greater in certain areas than in other areas, or alternatively, the density of the spacers may be approximately uniform throughout the entire unit. For purposes of example only, and without limitation, example VIG units which may be used for VIG unit 1 in the FIG. 1 embodiment are illustrated and/or described in U.S. Pat. Nos. 6,372,312, 6,365,242, 6,399,169, 6,336,984, 6,497,931, and/or 6,692,600, the disclosures of which are all hereby incorporated herein by reference. In FIG. 1, the inner/inboard lite 1 and the outer/outboard lite 3 of the overall window unit are provided in a building so that the building exterior 2 and the building interior 6 are provided on opposite sides of the window unit.

In certain example embodiments, a highly insulated foam core insulating frame 30 may be used to support the inner and outer lites 1, 3. In certain example embodiments, the foam functions as insulating so as to provide an insulating function and structure for supporting the lites 1, 3. The insulating frame 30 may be a window sash in certain example embodiments of this invention, and may have a polymer based cover (e.g., vinyl) surrounding a foam core in certain example instances. The VIG unit 1 may be partially embedded or supported (e.g., by from about 1-6 inches, more preferably from about 1 to 3 inches, with an example being about 2 inches) in the foam frame 30, so that the foam inclusive insulating frame 30 separates the VIG unit inboard lite 1 from the monolithic outboard lite 3 thereby reducing conductivity around the edges of the window unit so that R-value can be increased (and U-value increased).

In certain example embodiments, as shown in FIG. 1, the edges of the inboard and outboard lites 1 and 3 may be vertically offset from one another, to further reduce conductivity at edges portions. VIG units tend to have some conductivity between the two glass sheets thereof at the edge area near seal 4. However, the vertical offset between the bottom edge (and possible the upper and/or side edges also) of the VIG unit 1 and that of the monolithic lite 3 helps reduce conductivity between the edges of lites 1 and 3 for the overall window unit thereby improving the R-value thereof. The VIG lite 1 is located on the inboard side in certain example embodiments, so as to avoid temperature swings on the inner side of the window unit and to protect the VIG unit from potential damage from the exterior of the building on which the window unit is located. It is also noted that the fairly long bite "B" between the bottom edge of the VIG unit and the upper edge of the bottom frame portion advantageously makes it more difficult for heat and/or cold to makes its way around the edge of the VIG unit 1 thru the possible solder edge seal 4. The distance of bite "B" is from about 1 to 5 inches, more preferably from about 1-3 inches (e.g., 2 inches) in certain example embodiments of this invention.

In certain example embodiments, the total R-value of the window unit is at least about R-8, and more preferably at least about R-10 (compared to the much lower R-values of conventional IG units).

In the FIG. 1 embodiment, the outer monolithic lite 3 may be glued to the sash/frame 30 via adhesive at area 40 which may also function as a seal. Bottom stop 44 upon which outboard lite 3 rests in first L-shaped channel 46 is optional. L-shaped channel 46 is defined in the frame/sash 30, with the vertical portion of the channel 46 receiving the lite 3 and the horizontal portion of the channel permitting the optional stop 44 to be inserted and/or removed. Glue may also be put in the channel 46 to hold the lite 3 in place. A second L-shaped channel 48 is also provided in the sash or frame 30. Second L-shaped channel 48 is also defined in the frame/sash 30, with the vertical portion of the channel 48 receiving the VIG lite 1 and the horizontal portion of the channel permitting the optional stop 50 to be inserted and/or removed in the frame. Glue may also be put in the channel 48 to hold the VIG lite 1 in place. Again, the VIG lite 1 is held in place via glue at areas 50a in certain example instances.

In order to achieve a high R-value for the overall window unit, one typically has good insulating properties in three primary areas of the window; namely the center of the window (e.g., the daylight opening minus about a 2.5 inches perimeter near the siteline), the edge of the glass (e.g., the 2.5 inch perimeter of the daylight opening near the siteline, and the frame (e.g., the opaque structural component surrounding the glass that holds the glass in place). These three areas act in parallel for heat flow, and one area with very high thermal conductivity will allow undesirable large amounts of heat to flow through that channel. Typically, multiple layers of glass have been used to reduce heat flow through the center of the glass, although low-E coatings and gas such as Ar have also been used. Low conductivity spacers at the perimeter are typically used to reduce conductivity at the edge. Framing is typically designed to hold a glazing unit with an approximately one-half inch bite on the edge of the unit.

The VIG unit 1 uses two sheets of glass 7 and 9 with an optional low-E coating on one of the glass sheets to reach a center-of-glass R-value of about 10 or more. However, the VIG unit 1 may have a solder glass edge seal 4 at or near the perimeter to seal the two glass sheets together, which allows for an easy path for heat to flow from one glass sheet to the other. The window of FIG. 1 however overcomes this problem with the VIG unit by embedding the edge of the VIG unit 1 in the insulating frame/sash 30 with a fairly long bite B. The combination of the insulating properties of glass along the path length around the edge of the VIG unit (two times the bite length) acts as a thermal barrier. The larger bite B results in a larger R-value for the window unit. In certain example embodiments, the frame 30 has a core of highly insulating foam such as polyisocyanurate (e.g., R-6.5 per inch)—two inches of this would provide an R-value of about 13. A protective layer of fiberglass reinforced plastic or wood veneer could also be used as the covering of the foam core, with the structure L-channels 46 and 48 designed to follow the isothermals of the heat flow in the framing system. The outside surface of the framing system could be expected to reach temperature extremes of −50 degrees F. to plus 150 degrees F., such that the outer skin of the framing may be designed to flex to absorb such temperature extremes without causing significant warping for limited time periods. The outboard monolithic lite 3 helps shield the VIG unit 1 from certain temperature extremes.

In certain example embodiments, the overall window unit of example FIG. 1 may be characterized by the following R-values. First, center of glass: VIG=10, outboard low-E lite=2; total center of glass is about R-12 or more. Second, edge of glass (2.5" perimeter): 4 inch heat path on 4 mm glass is approximately R-6. Third, frame of window: R-13 for foam minus thermal bridging losses of structure R-10. Thus, the combined total thermal resistance of the overall window is approximately R-8 or higher, more preferably about R-10 or higher. The final R-value of the overall window is dependent on the height and width of the window, the thickness of the glass, the depth of the bite "B" on the VIG unit, and the extent of thermal bridging in the frame 30.

It is noted that large edge bites on a VIG unit can reduce high stresses imposed on a glazing due to extreme temperature differences between indoor and outdoor temperatures. This would reduce the likelihood of glass fracturing in extreme climates. Moreover, the outboard monolithic lite (3) may be used also to reduce the indoor to outdoor temperature difference. In addition, large edge bites on a VIG can reduce the relative area of the very cold glass (outer VIG pane) to the much warmer glass (indoor VIG pane). Furthermore, the stresses may be distributed more uniformly across the large edge area of the window unit.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A window unit comprising:
   an insulating frame in which both an inboard glass lite and an outboard glass lite are partially embedded, the inboard lite comprising a vacuum IG unit including first and second spaced apart glass sheets having the same height, that are separated from one another via a gap that is at a pressure less than atmospheric, and the outboard lite comprising a monolithic glass sheet spaced apart from the vacuum IG unit;
   wherein the frame comprises insulating material that separates the surface of the vacuum IG unit closest to the monolithic glass sheet from the inner surface of the monolithic glass sheet;
   wherein along at least one of a top edge, a bottom edge, and/or a side edge of the window unit, the outer edge of the monolithic glass sheet is vertically offset from the outer edge of the vacuum IG unit so that the outer edge of the vacuum IG unit is closer to a periphery of the window unit than is the outer edge of the monolithic glass sheet;
   wherein a gap between the inboard lite and the outboard lite is substantially at atmospheric pressure, so that the gap on one side of the second glass sheet provided between the first and second sheets is at a pressure less than atmospheric pressure, but the gap on the other side of the second glass sheet provided between the second glass sheet and the outboard lite is substantially at atmospheric pressure; and
   wherein a total R-value of the window unit is at least about R-8.

2. The window unit of claim 1, wherein a low-E coating is provided on the inner surface of the monolithic glass sheet.

3. The window unit of claim 1, wherein the frame comprises an outer portion which at least partially surrounds an insulating foam core, wherein at least part of the foam core is located between the vacuum IG unit and the monolithic glass sheet.

4. The window unit of claim 1, wherein a substantially L-shaped channel is defined in the frame, wherein a vertical channel portion of the substantially L-shaped channel receives part of the vacuum IG unit.

5. The window unit of claim 4, wherein a support member is provided at a bottom of the vertical channel portion, and a bottom of the vacuum IG unit rests on the support member.

6. The window unit of claim 1, wherein a substantially L-shaped channel is defined in the frame which receives part of the monolithic glass sheet.

7. The window unit of claim 1, wherein the frame has a bite (B) of from about one to three inches.

8. The window unit of claim 1, wherein a total R-value of the window unit is at least about R-10.

9. The window unit of claim 1, wherein the frame has a bite, and
   wherein a path length around an edge of the vacuum IG unit is longer than the bite.

10. The window unit of claim 9, wherein the path length is twice as long as the bite.

11. The window unit of claim 1, further comprising a plurality of adhesive seals provided at discrete locations between (a) inner and outer surfaces of the vacuum IG unit, and walls of a first channel in which the vacuum IG unit is at least partially embedded, and (b) inner and outer surfaces of the monolithic glass sheet, and walls of a second channel in which the monolithic glass sheet is at least partially embedded.

12. The window unit of claim 1, wherein the frame comprises first and second substantially L-shaped channels defined therein,
   wherein substantially vertical portions of the first and second channels respectively receive portions of the vacuum IG unit and the monolithic glass sheet, and
   wherein substantially horizontal portions of the first and second channels respectively extend from bottom portions of the substantially vertical portions of the first and second channels in substantially opposite directions.

13. The window unit of claim 12, wherein stoppers are provided at the bottom portions of the first and second channels.

14. A window unit comprising:
   an insulating frame in which a vacuum IG unit and a monolithic lite are provided, the vacuum IG unit including first and second spaced apart glass sheets having the same height, that are separated from one another via a gap that is a pressure less than atmospheric, and the monolithic lite being spaced apart from the vacuum IG unit;

wherein the frame comprises insulating material that separates the vacuum IG unit from the monolithic lite;

wherein a gap between the vacuum IG unit and the monolithic lite is substantially at atmospheric pressure, so that a gap immediately adjacent one side of an outer glass sheet of the vacuum IG unit is at a pressure less than atmospheric pressure, but another gap on the other side of said outer glass sheet of the vacuum IG unit is substantially at atmospheric pressure; and wherein a total R-value of the window unit is at least about R-8.

15. The window unit of claim 14, wherein along at least one of a top edge, a bottom edge, and/or a side edge of the window unit, the outer edge of the monolithic lite is vertically offset from the outer edge of the vacuum IG unit so that the outer edge of the vacuum IG unit is closer to a periphery of the window unit than is the outer edge of the monolithic lite.

16. The window unit of claim 15, wherein a low-E coating is provided on an interior surface of the monolithic lite, and wherein the monolithic lite is provided closer to an exterior of a building in which the window unit is located than is the vacuum IG unit.

17. The window unit of claim 14, wherein the frame comprises an outer portion which at least partially surrounds an insulating foam core, wherein at least part of the foam core is located between the vacuum IG unit and the monolithic lite.

18. The window unit of claim 14, wherein a substantially L-shaped channel is defined in the frame, wherein a vertical channel portion of the substantially L-shaped channel receives part of the vacuum IG unit.

19. The window unit of claim 18, wherein a support member is provided at a bottom of the vertical channel portion, and a bottom of the vacuum IG unit rests on the support member.

20. The window unit of claim 14, wherein a substantially L-shaped channel is defined in the frame which receives part of the monolithic lite.

* * * * *